United States Patent

[11] 3,624,004

| [72] | Inventor | Arnold N. Wennerberg<br>Chicago, Ill. |
|---|---|---|
| [21] | Appl. No. | 706,145 |
| [22] | Filed | Feb. 16, 1968 |
| [45] | Patented | Nov. 30, 1971 |
| [73] | Assignee | Standard Oil Company<br>Chicago, Ill. |

[54] PROCESS FOR THE PRODUCTION OF ACTIVE CARBONS
15 Claims, 2 Drawing Figs.

[52] U.S. Cl..... 252/445,
23/209.2, 210/24, 252/422, 252/425
[51] Int. Cl..... C01b 31/08,
C01b 31/10
[50] Field of Search..... 23/422,
425, 209.1, 209.2; 252/445; 260/515, 523; 210/24

[56] References Cited
UNITED STATES PATENTS

| 2,640,075 | 5/1953 | Goedkoop | 260/515 |
| 2,673,216 | 3/1954 | Goedkoop | 260/515 |

*Primary Examiner*—Edward J. Meros
*Attorneys*—Arthur G. Gilkes, William T. McClain and Thomas L. Trinley ABSTRACT: Process for the production of active carbons by the controlled oxidative activation with carbon dioxide of pyrolyzed salts of aromatic acids including monocarboxylic acids such as benzoic acid; polycarboxylic acids such as terephthalic, isophthalic, trimesic, or trimellitic acids; polynuclear carboxylic acids such as naphthoic acid; and polycarboxylic acids, such as coke acid. Carbons having surface areas in excess of 2000 m.$^2$/g. may be obtained. The active carbons are particularly suitable for water purification.

PROCESS FOR THE PRODUCTION OF ACTIVE CARBONS

BACKGROUND OF INVENTION

This invention relates to a novel class of compounds and to a unique method of activation or carbonaceous material.

Although $CO_2$ activation of various carbonaceous materials is known to the art, such activation generally suffers from the disadvantage of relatively high-activation temperatures and poor control over surface areas, pore diameter and pore distribution. This is generally due to the degradative effect of oxidation on the carbonaceous material. In other words, the oxidant will attack a given pore and enlarge it, with selectivity of oxidant being proportional to pore size. This in turn will cause a largening of large pores, with perhaps even a sacrifice of surface area, and certainly very little control of pore size and distribution.

Carbons obtained from the thermally decomposed salts of aromatic acids are described in U.S. Pat. application Ser. No. 706,146 filed of even date and entitled, "Activated Carbon and Process for the Production of Activated Carbon," the inventors of which are A. N. Wennerberg and R. M. Alm (hereinafter designated "Wennerberg-Alm Application," Ser. No. 706,146). In general, active carbons derived from the salt pyrolysis technique described in said Wennerberg-Alm Application, possess high surface areas with a high degree of uniformity in pore size, and the process may yield high surface carbons wherein the pore structure is almost entirely of a micropore type (pore diameter 10A or less). The present activation technique makes it possible to uniformly expand the pores of these microporous carbons to very high surface carbons with pore diameters in the range of 20A–100A. Not only does this technique not sacrifice surface area, but it has been found to improve it. Carbons having surface areas in excess of 2,000 m.$^2$/g. may be obtained. The carbons of this invention are particularly suitable to water purification applications and other possible separations of components in solution.

SUMMARY OF THE INVENTION

It has been found that the controlled oxidative activation of carbonaceous material with $CO_2$ provides significant improvement in the active carbons.

FIG. I is a plot of the effect of activation time on surface area. FIG. II is a plot of cumulative pore volume against pore diameter comparing a product of the present invention with a commercially available carbon.

In general, the process of this invention comprises contacting pyrolyzates with $CO_2$ at a temperature in the range of 700°–1,200° C. The pyrolyzates are the compositions formed by treating an aromatic carboxylic acid with a suitable electrolyte to at least form the salt of the acid, and then thermally decomposing the resultant mixture. The activation chamber may be any suitable vessel within which the pyrolyzate may be heated and contacted with $CO_2$ gas at suitable flow rates. Since the initial pyrolysis of the carboxylic acid salt is preferably carried out in a heated rotating kiln, the subsequent activation with $CO_2$ may also be carried out in the same or similar kiln at the desired temperature and $CO_2$ flow or contact rate. The activation is preferably carried out at atmospheric pressure or slightly above. The flow rate of $CO_2$ may be varied over a wide range within the operating temperature range in order to realize the desired degree of increase in surface area and change in pore size and pore size distribution. A preferred temperature range is 750° C. to 950° C. The aromatic acid may be any compound having an acid radical directly attached to the benzene ring and capable of forming a soluble salt with electrolyte. Other functional groups may be present without deleterious effect. The acid radical may be $COOH$, $SO_3H$, $SO_3NH_2$, $PO_3H$, etc. Aromatic carboxylic acids are preferred, any may be simple monocarboxylic acids, such as benzoic acid or polycarboxylic acids, such as terephthalic, isophthalic, trimesic, or trimellitic, polynuclear carboxylic acids, such as napthoic acid, or polynuclear polycarboxylic acid, such as coke acid. It is also contemplated that the aromatic carboxylic acids may be derived from any suitable carbonaceous material which is subsequently oxidized to form the carboxylic acid. For example, petroleum coke may be oxidized to form the coke acid. The feed material may be treated, when necessary, to remove contaminants or undesirable elements. For example, petroleum coke has a metal content, which, of course, is unsuitable for obtaining an ash-free carbon, but oxidation with nitric acid serves a dual function, i.e., forms the acid and removes metals.

The electrolyte must be capable of a blocking or defecting effect. That is, upon drying and thermal decomposition, a highly cross-linked carbon structure is formed within which the included electrolyte along with salts formed by decomposition occupy and maintain the defect (pore) volume during the carbonization process. When the electrolyte is removed from the product carbon structure, a defect volume or pore space is retained in the interlocking, stabilized carbon structure. The electrolyte should also be of such nature and the quantity used should be sufficient to at least be capable of converting the acid to the salt form, however, the term electrolyte, as used herein, is intended to mean (1a compound capable of forming salt with the acid used and capable of providing the blocking effect or (2) more than one compound, one of which is used to neutralize the acid and additional compound or compounds which may be added simultaneously with or subsequently to neutralization to provide higher surface areas, and/or to control pore size and distribution. Examples of substances used as coelectrolytes are potassium hydroxide with potassium chloride or potassium carbonate or sodium hydroxide with sodium chloride. It is possible that by use of an electrolyte containing ions of different sizes, different size pores will result. The ability to form the salt is necessary in order that the compound may be soluble. The solubilizing of the compound allows for proper alignment of the molecules.

The electrolyte advantageously is an alkali metal compound because of the solubility of the salts and the ease of removal after thermal decomposition. It has been found, for example, that when calcium salts are used, digestion is required for removal. The alkali metal hydroxide may be used as the electrolyte to form the salt of the acid, and excess hydroxide may be used to provide additional blocking and, hence, increase surface area. In addition to excess hydroxide, alkali metal halide, carbonate, sulfate, phosphate, nitrate, oxide and other metal ion sources, etc., may be used as the electrolyte. Mixtures of electrolyte and aromatic carboxylic acid or more specifically petroleum coke acid have been used wherein the amount of excess electrolyte has varied widely. For example, up to 5.8 excess equivalents of potassium hydroxide, 6.0 excess equivalents of potassium carbonate, 8.0 excess equivalents of sodium hydroxide, 8.3 excess equivalents of sodium chloride, and 10.0 excess equivalents of potassium chloride have been used.

Although active carbons may be prepared from salts of metals included with Groups I$a$, and II$a$, of the Periodic Table, and from ammonium, etc., the potassium salts are by far the most preferred. In fact, it is difficult to obtain surface areas of active carbons in excess of 1,000 sq. meters per gm., without additional treatment if potassium is not used. Potassium is also preferred because of its availability, cheapness and it provides high-water solubility (water is, of course, a preferred solvent). Active carbons prepared by use of metals other than potassium, is spite of this, have been found to be highly desirable and highly preferred over commercial products. Another interesting and unexpected result of our invention is that although it has been found that pore size is related to the size and quantity of the defecting material, it has also been found that metals other than potassium do not provide as great an incremental increase in surface area as a result of the addition of a given excess quantity of a defecting material, as is true of potassium. Active carbons made from cations other than potassium may be produced with surface areas approaching those obtained with potassium by increasing the solubility of the salt, e.g., by raising the temperature of the solution.

The thermal decomposition of the salts is accomplished by pyrolyzing the salts in an inert atmosphere. Since no oxidants are present, this is a true thermal decomposition. Prior to pyrolysis, the solvent is removed in order to provide structural stability to the molecule incorporating the defecting agent. The drying step may be accomplished by slowly raising the temperature prior to pyrolysis. This will ensure structural integrity. However, any evaporative technique may be used. Thermal decomposition may be accomplished in a pyrolysis chamber where the alkaline decarboxylation pyrolysis is carried out. The reaction may use a fluidized technique, continuous conveyor surface or fixed bed method. The temperature should be sufficient to decompose the salt, but less than the graphitization temperature of the carbon; preferably between 450° C. and 1,000° C. Temperatures between 700° C. and 800° C. are particularly preferred. The crude pyrolyzate produced should then be washed to remove alkaline, byproduct salts and excess alkali metal compounds. Removed products may be recycled for the formation of additional salts. The washed, neutral, carbon powder may then be dried and thereafter fabricated to the particular particle size or form desired. For some uses a granular adsorbent is more desirable than the powered material (e.g., for use in bed systems.) The granular adsorbent may be prepared by deposition of the salt on a suitable substrate prior to pyrolysis; the material may then be pyrolyzed, washed to remove soluble salts, and dried. Suitable solids on which the salts may be deposited are petroleum coke, ground coal, silica, alumina, ground limestone, dolomite, lime and other substances that can be heated to the temperature needed to pyrolyze the salts without being decomposed themselves.

It may be possible to minimize the evaporation of solvent required prior to pyrolysis. This would represent a saving of the heat necessary to dry the salt. The elimination of the drying step, therefore, is desirable.

To avoid the drying step, the acid may be neutralized in a saturated solution of the acid salt and the electrolyte. Upon further neutralization of acid, the salt will precipitate, and the precipitate may be filtered. The precipitate, depending upon the quantity of the electrolyte used, would also include electrolyte. It is possible that because of the highly saturated solution, gelling the of salts may occur. This can be avoided by suitable agitation.

A particular embodiment of the present invention comprises treating with $CO_2$ a pyrolyzed mixture of petroleum coke acids and electrolyte. In this embodiment the following sequence of steps takes place: controlled oxidation of petroleum coke to form the coke acid which may be then be neutralized in water with a suitable alkali metal hydroxide or oxide to produce an aqueous solution of the coke acid salt; excess electrolyte—which may be basic or neutral—is added; water may then be removed from the salt solution; the dried mixture thermally decomposed; and then the resultant pyrolyzate contacted with $CO_2$. A preferred method for preparing the petroleum coke comprises the controlled oxidation of petroleum coke by the use of aqueous nitric acid in the concentration range of 20 percent to 80 percent by weight in water.

More specifically, suspended, finely divided coke is oxidized at atmospheric or elevated pressures in either a batch-type reactor or a continuous suspension flow system. The suspended coke acid is then separated by filtration and the filtrate, aqueous nitric acid solution, may then be recycled for reuse in the oxidation. The crude coke acid produced may then be washed with water to remove any traces of nitric acid.

When carrying out the oxidation reaction at atmospheric pressure, the coke:nitric acid ratio may be in the range of from 1:2 to 1:10 by weight, preferably 1:5. The preferred concentration of the nitric acid is 30 percent to 50 percent by weight. The reaction temperature may vary from 50° C. to 125° C. It is preferred that the temperature initially be at the lower portion of this range and then be gradually increased to the upper portion of the range at the end of the reaction period. The reaction period may vary from 5 to 24 hours, depending upon the degree of agitation in the reactor, the degree of subdivision of the coke, the concentration of the aqueous nitric acid, and the rate of increase of temperature. For example, a 50 weight percent aqueous nitric acid solution, with coke: acid ratio of 1:5 by weight which is vigorously agitated, may be heated from 60° C. to 120° C. for a 6 to 8-hour period to complete oxidation of the coke. A typical coke oxidation is shown in example I:

EXAMPLE I

Preparation of Coke Acid by Oxidation of Petroleum Coke 400 g. of petroleum coke was suspended in 2,500 ml. (2,856 g.) of 55 percent $HNO_3$ within a 3-necked 5 l. round-bottomed flask. The flask was equipped with a stirring rod and paddle inserted through the center neck. An efficient condenser and thermowell were connected to each of the two remaining side necks, respectively. The raw coke (about 20–40 mesh range) was stirred as a suspension while the reactor system temperature was raised from 25° C. to 112°–118° C. during the first 8 hours of reaction time. Byproduct gases from oxidation were vented out the condenser side during the course of reaction.

At the end of 8 hours reaction time, the spent aqueous $HNO_3$ solution was withdrawn from the suspension and replaced with a second charge of 2,500 ml. (2,856 g.) of 55 percent aqueous $HNO_3$. The reaction was continued for a second 8-hour period over a temperature range of 85° C. to 115° C. with most of the second reaction period at 100° C. to 118° C. At the completion of the second state of oxidation, the reaction product suspension was cooled at 25° C. and the suspended coke acid product separated from unreacted aqueous $HNO_3$ by filtration.

The crude acid reaction product was washed with cold water; five consecutive washes of 2,000 ml. volume per wash. The washed, finely divided product was dried in a vacuum oven to remove last traces of water. Yield of product was 480 g. having a neutralization equivalent of 240–260 mg. KOH/g.

| Elemental Analysis | Wt. % |
|---|---|
| C | 63.2 |
| H | 2.6 |
| O | 27.2 |
| N | 4.5 |
| S | 2.5 |

The neutralization reaction may be carried out in any suitable solvent, for example, water, water-acetone, water-tetrahydrofuran, etc. The nature of the salt will dictate the particular solvent necessary. The quantity of the electrolyte should be at least sufficient to neutralize the acid. It is preferred that substantially all the carboxyl groups be neutralized. Therefore, a pH of at least 7 is desirable, advantageously between 8 and 14. The temperature of the neutralization reaction should be sufficient to effect substantially complete solution of the product salt.

During the pyrolysis of the coke acid salt, any free acid and the salt are decarboxylated. It is preferred that any water associated with the salt be minimized prior to and during the pyrolysis step. This is advantageously accomplished in an evaporation unit. The solid salt may then be inserted in a pyrolysis chamber, and inert gas flow started in the chamber before heating to expel air that would cause high-temperature oxidation. The rate of temperature rise is preferably held constant. After the maximum desired temperature is reached, the pyrolysis chamber is allowed to cook, and inert gas flow continued until the chamber has cooled to room temperature.

The resultant pyrolyzate is then contacted with $CO_2$ at a temperature in the range of 700°–1,200° C., a preferred temperature range being 750° C. to 950° C.

EXAMPLE II

Salt Preparation—A solution was prepared containing 224 g. (1 equiv.) coke acids in 1,000 g. of acetone-water solvent. To this solution is added an aqueous solution containing 90 g. (1.38 equiv.) of 86 percent potassium hydroxide in 150 g. of water. The salt solution was stirred for 1 hour after which the solvent phase was removed by evaporation. Total yield of product salt was 298 g.

Salt Pyrolysis—50 g. of the product salt was charged to a rotating Vycor kiln under argon blanket, and the solid salt composition was pyrolyzed in the rotating kiln at 780° C. under argon. The rate of heating and/or duration of exposure to the temperature range 25° C. to 78° C. was the same as previously used, namely, 60 minutes.

DESCRIPTION OF PREFERRED EMBODIMENTS

EXAMPLE III

Figure 1:
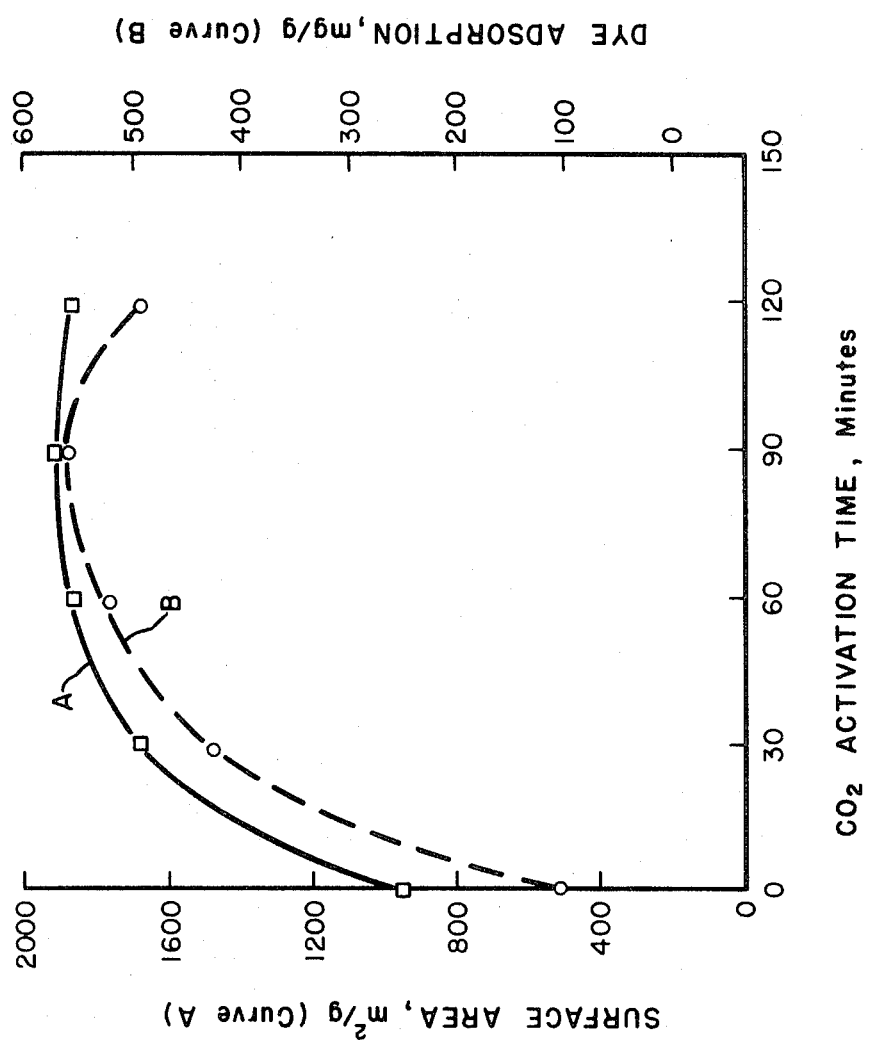
Figure 2:
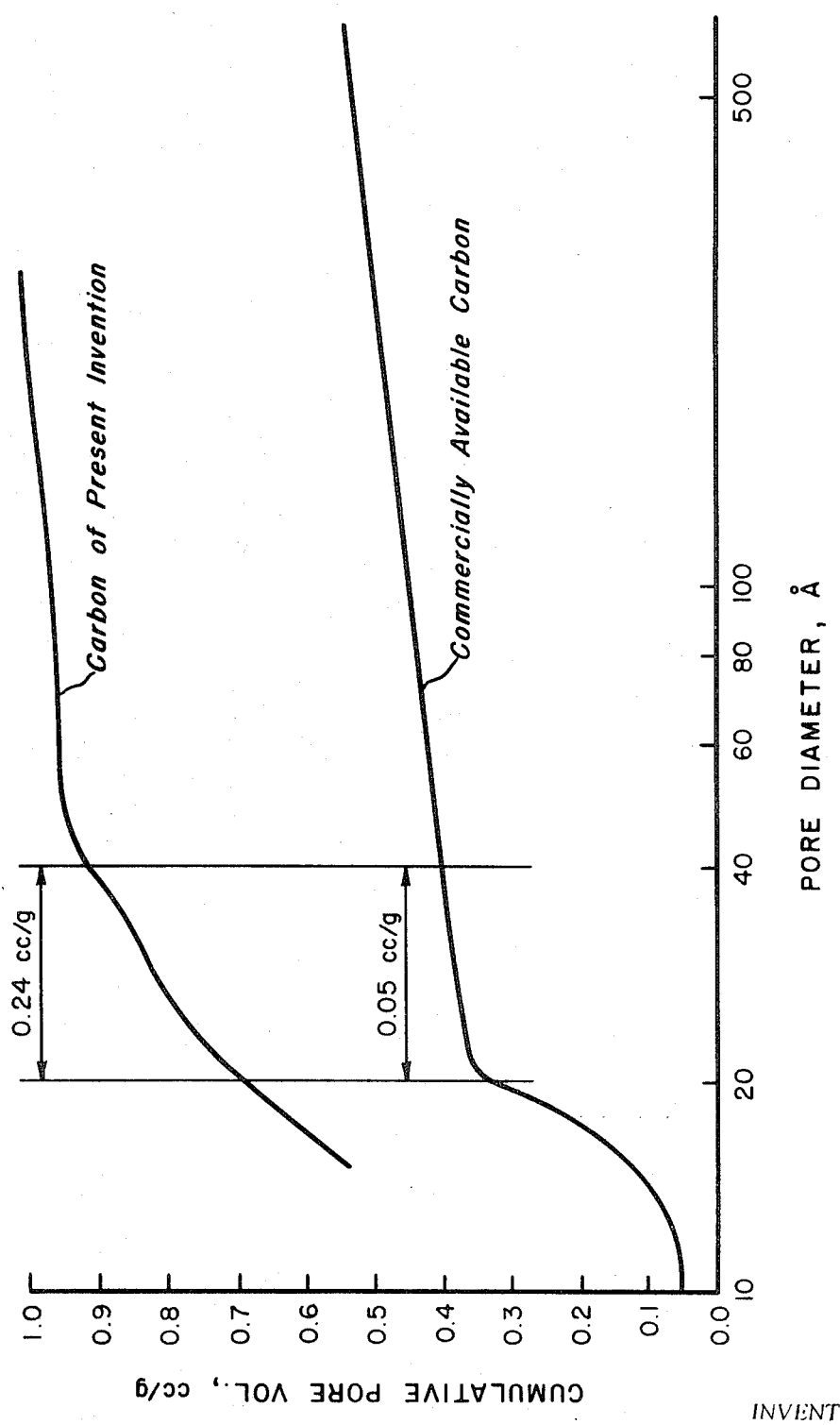

"Samples of K+ salts of coke acids were pyrolyzed at 780° C. under argon sweep with the heat up duration from 25° C. to 780° C. being 60 minutes for each sample. Subsequent to pyrolysis under argon, each of five samples was exposed to increasing time of contact with $CO_2$ at 780° C. in a 400 ml. rotating Vycor kiln with the $CO_2$ flow rate at 0.1 S.C.F.M."

| Sample | Treatment | Surface Area (m.²/g. Recovered Carbon) |
|---|---|---|
| I. a. | Argon to 780° C. | 1060 |
| b. | $CO_2$ at 780° C./15 min. | 1272 |
| c. | $CO_2$ at 780° C./30 min. | 1683 |
| d. | $CO_2$ at 780° C./60 min. | 1923 |
| e. | $CO_2$ at 780° C./90 min. | 2178 |

EXAMPLE IV

"Samples of K+ salts of coke acids were pyrolyzed at 780° C. under argon sweep with the heat up duration from 25° C. to 780° C. being 60 minutes for each sample. Following this pyrolysis step samples were exposed to $CO_2$ activation at 780° C. in a 400 ml. rotating kiln for the following specified time at a $CO_2$ flow rate of 0.3 S.C.F.M."

| Sample | Treatment | Surface Area (m.²/g.) Recovered Carbon |
|---|---|---|
| II a. | Argon to 780° C. | 940 |
| b. | $CO_2$ at 780° C./30 min. | 1874 |
| c. | $CO_2$ at 780° C./60 min. | 2068 |
| d. | $CO_2$ at 780° C./90 min. | 2317 |

FIG. I summarizes a typical response of $CO_2$ activation by contacting K+ coke acid salt pyrolyzate with $CO_2$ for increasing duration of time, and FIG. II shows the effect of $CO_2$ activation of example I compared to a commercially available carbon. It is clear the pore size and pore distribution not only do not suffer from the $CO_2$ activation of the present invention, but show highly superior characteristics.

I claim:

1. A process for the preparation of high-surface area active carbon, comprising contacting a pyrolyzate with gaseous carbon dioxide at temperatures sufficient to produce an increase in the surface area of the pyrolyzate, wherein said pyrolyzate is that product resulting from mixing an aromatic acid and an electrolyte capable of providing a blocking or defecting effect and in an amount sufficient to, at least, form a salt of the aromatic acid and subjecting same to a temperature between 450° C. to 1,000° C.

2. The process of claim 1 wherein the ratio of equivalents of electrolyte to acid is greater than unity.

3. The process of claim 2 wherein the acid functionality of the aromatic acid is contributed by at least one ring-sustituent selected from the class of acid radicals consisting of COOH, $SO_3H$, $SO_3NH_2$ or $PO_3H$.

4. The process of claim 2 wherein the aromatic acid is an aromatic carboxylic acid selected from the group consisting of monocarboxylic acid, polycarboxylic acid, polynuclear carboxylic acid, polynuclear polycarboxylic acid, and mixtures thereof.

5. The process of claim 2 wherein the aromatic carboxylic acid is petroleum coke acid prepared by oxidizing petroleum coke with nitric acid.

6. The process of claim 2 wherein the acid is a mononuclear, polycarboxylic acid having carboxy groups in para positions.

7. The process of claim 2 wherein each electrolyte consists of (a) an anion selected from the group consisting of hydroxide, oxide, halide, carbonate, sulfate, phosphate and nitrate, and (b) a cation selected from the group consisting of metals of Groups Ia and IIa of the Periodic Table.

8. The process of claim 2 wherein the electrolyte consists essentially of potassium hydroxide.

9. The process of claim 2 wherein potassium hydroxide is a coelectrolyte with a second electrolyte consisting of (a) an anion selected from the group consisting of oxide, halide, carbonate, sulfate, phosphate and nitrate, and (b) a cation selected from the group consisting of metals of Groups Ia and IIa of the Periodic Table.

10. The process of claim 9 wherein each electrolyte consists of (a) an anion selected from the group consisting of hydroxide, oxide, halide, carbonate, sulfate, phosphate and nitrate, and (b) a cation selected from the group consisting of metals of Groups Ia and IIa of the Periodic Table.

11. The process of claim 9 wherein the electrolyte consists essentially of potassium hydroxide.

12. The process of claim 9 wherein potassium hydroxide is a coelectrolyte with a second electrolyte consisting of (a) an anion selected from the group consisting of oxide, halide, carbonate, sulfate, phosphate and nitrate, and (b) a cation selected from the group consisting of metals of Groups Ia and IIa of the Periodic Table.

13. The process of claim 10 wherein each electrolyte consists of (a) an anion selected from the group consisting of hydroxide, oxide, halide, carbonate, sulfate, phosphate and nitrate, and (b) a cation selected from the group consisting of metals of Groups Ia and IIa of the Periodic Table.

14. The process of claim 10 wherein the electrolyte consists essentially of potassium hydroxide.

15. The process of claim 10 wherein potassium hydroxide is a coelectrolyte with second electrolyte consisting of (a) an anion selected from the group consisting of oxide, halide, carbonate, sulfate, phosphate and nitrate, and (b) a cation selected from the group consisting of metals of Groups Ia and IIa of the Periodic Table.

* * * * *